UNITED STATES PATENT OFFICE.

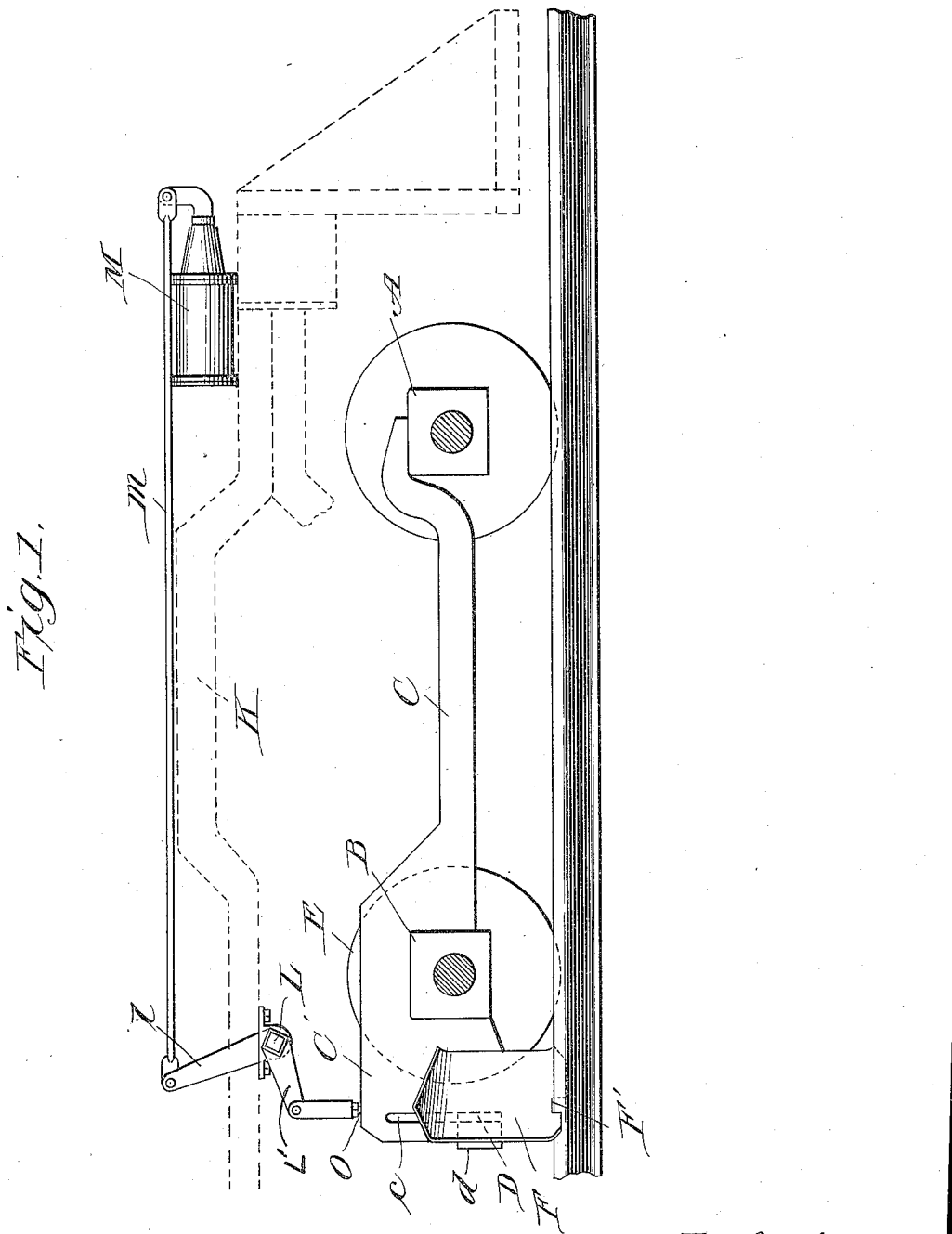

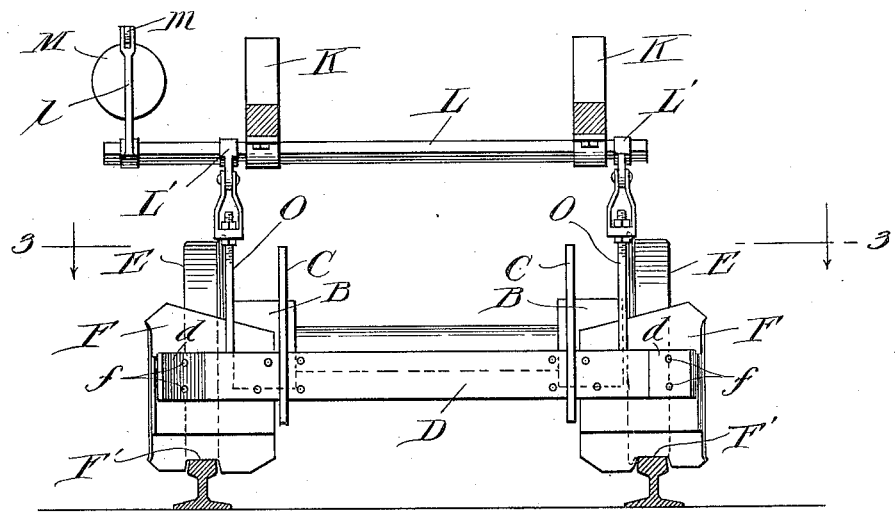
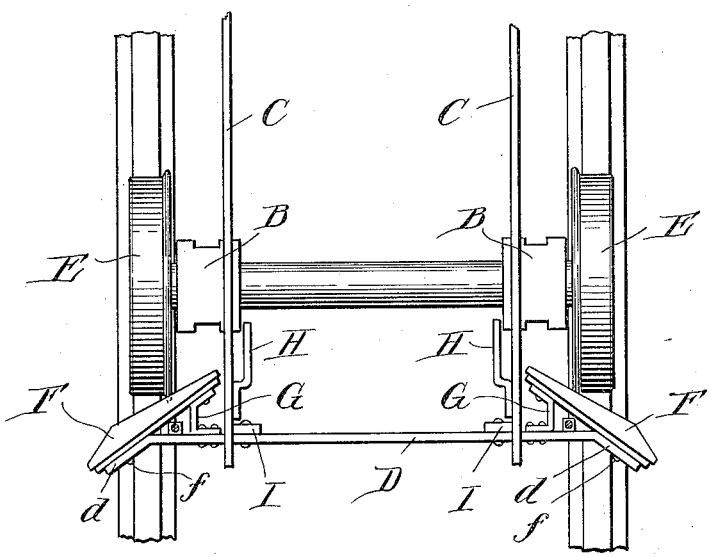

HUGH MONTGOMERY, OF MILO JUNCTION, MAINE, ASSIGNOR TO RAILWAY APPLIANCES COMPANY, OF CHICAGO, ILLINOIS, A CORPORATION OF ILLINOIS.

SNOW-FLANGER.

1,057,574. Specification of Letters Patent. Patented Apr. 1, 1913.

Application filed December 17, 1910. Serial No. 597,823.

*To all whom it may concern:*

Be it known that I, HUGH MONTGOMERY, a citizen of the United States, residing at Milo Junction, county of Piscataquis, State of Maine, have invented a certain new and useful Improvements in Snow-Flangers, and declare the following to be a full, clear, and exact description of the same, such as will enable others skilled in the art to which it pertains to make and use the same, reference being had to the accompanying drawings, which form a part of this specification.

My invention has for its object to produce a simple and serviceable device adapted to be carried by a locomotive for the purpose of removing snow and ice from the rails in advance of the locomotive drivers, without danger of scraping torpedoes from the rails before an opportunity is given the torpedoes to explode.

The various features of novelty whereby my invention is characterized will hereinafter be pointed out with particularity in the claim; but for a full understanding of my invention and of its object and advantages, reference may be had to the following detailed description taken in connection with the accompanying drawings, wherein:

Figure 1 is a view partly in side elevation and partly in section of one of my improved flangers in place on a locomotive, only the axle wheels and journal boxes of the truck being shown, and a portion of the locomotive frame being indicated in dotted lines; Fig. 2 is a view of the truck looking toward the left in Fig. 1; and Fig. 3 is a view of the truck looking down on Fig. 2, the locomotive frame being omitted.

In the drawings I have illustrated my invention as applied to a four-wheeled locomotive truck: A and B representing the axle boxes and C, C equalizer bars, there being one of these bars mounted on the axle boxes at each side of the truck. At the rear end of each of the equalizer bars is a rearwardly and downwardly extending portion C' provided with an elongated vertical slot c.

D is a metal bar extending transversely across the rear of the truck behind the rear wheels E, E. This bar extends through the slots in the equalizers and has its ends projecting outwardly beyond the wheels. The extreme end portions of the bar are bent rearwardly at an acute angle to the remainder of the bar so as to determine the plane in which the flanger blades lie.

F, F represent the flanger blades, each lying flat against the front faces of one of the end portions d of the bar D and being secured in place by means of bolts or rivets f. The blades are made wide enough to extend inwardly past the wheels and into proximity to the equalizers. The inner ends of the blades are secured to the bar D by means of angle irons or braces G which are secured in any suitable manner both to the blades and to the bar. Thus it will be seen that each of the flanger blades is rigidly secured at one end of the bar wholly on the outside of the adjacent equalizers. When in use, the blades occupy the positions indicated in the drawings, the notches F' therein receiving the heads of the rails. As the locomotive moves forward the blades scrape the snow and ice from the rails, leaving them clean and affording a good grip for the driving wheels. The thrust upon the blades in the rearward direction has a tendency to bend the rear ends of the equalizers inwardly, and to prevent this I mount on the inner side of each of the equalizers a stop or abutment H which is adapted to engage with the inner vertical face of the adjacent journal box. The members H also serve to maintain the equalizers in alinement transversely of the truck since the equalizers are loosely tied together by the bar D which is provided with shoulders I engaging the equalizers on the inner sides.

Mounted on the frame K of the locomotive above the flanger is a transverse rotatable shaft L which is adapted to be oscillated in any suitable manner as, for example, by means of a lever $l$ connected to a steam operated or pneumatic motor M by means of a rod $m$. The shaft L is provided with two lever arms L' which are rigidly secured thereto at points above the flanger blades. The free ends of these lever arms are connected to the projecting ends of the bar D by means of depending rods O. It will be seen that by actuating the motor in one direction or the other, the flanger blades will be raised or lowered, depending upon the direction of movement of the motor, the bar moving up and down in the vertical slots in the equalizers.

It will be seen that by arranging the flangers in the rear of the locomotive truck, the truck wheels are permitted to run over the rails before they are cleaned so that if there happens to be a torpedo on the track it will have a chance to explode before the flanger blades approach it. Where the flanger blades are arranged in front of the truck wheels, it is necessary to keep the blades high enough above the tops of the rails to prevent them from scraping off any torpedoes which may happen to be on the rails, and even then the snow and ice, piling up in advance of the flanger blades sometimes results in displacing torpedoes. By my arrangement the flanger blades may be lowered into close proximity to the surfaces of the rails so as to insure cleaning them effectively, without in any way interfering with the torpedoes.

While I have illustrated and described with particularity only a single form of my invention I do not desire to be limited to the specific details so illustrated and described; but intend covering all constructions and arrangements which fall within the terms employed in the definitions of my invention constituting the appended claim.

What I claim is:

The combination with a locomotive truck, of equalizers carried thereby and depending in rear of the wheels thereof, the depending ends of the equalizers having elongated vertical slots therein, a bar arranged transversely of the truck and extending through said slots, said bar having shoulders adapted to engage with the inner faces of the equalizers, the extreme ends of the bars being bent rearwardly at an acute angle, flanger blades secured to the bent ends of the bar and extending inwardly toward the equalizers, and braces between the inner ends of the flanger blades and the bar, said braces serving as shoulders to engage the outer sides of the equalizers.

In testimony whereof, I sign this specification in the presence of two witnesses.

HUGH MONTGOMERY.

Witnesses:
FRED M. CURTIS,
RUBY K. PAGE.

---

Copies of this patent may be obtained for five cents each, by addressing the "Commissioner of Patents, Washington, D. C."